US012730464B2

(12) United States Patent
Bimbi et al.

(10) Patent No.: US 12,730,464 B2
(45) Date of Patent: Sep. 8, 2026

(54) VOLTAGE REGULATION CIRCUIT WITH AN INDEPENDENT REFERENCE VOLTAGE

(71) Applicant: STMICROELECTRONICS S.r.l., Agrate Brianza (IT)

(72) Inventors: Cesare Bimbi, Paterno' (IT); Salvatore Giuseppe Privitera, Paterno' (IT); Francesco Pulvirenti, Acireale (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 231 days.

(21) Appl. No.: 18/611,321

(22) Filed: Mar. 20, 2024

(65) Prior Publication Data

US 2024/0329674 A1 Oct. 3, 2024

(30) Foreign Application Priority Data

Apr. 3, 2023 (IT) ........................ 102023000006477

(51) Int. Cl.
*G05F 1/46* (2006.01)

(52) U.S. Cl.
CPC .................................... *G05F 1/468* (2013.01)

(58) Field of Classification Search
CPC ....................................................... G05F 1/468
See application file for complete search history.

(56) References Cited

U.S. PATENT DOCUMENTS 8,237,425 B1 * 8/2012 Smith ..................... G05F 1/575 323/280
9,372,489 B2 * 6/2016 Kobayashi ................ G05F 1/56
(Continued)

FOREIGN PATENT DOCUMENTS

CN 204576336 U * 8/2015
JP 2011091759 A 5/2011
WO WO 2021241257 A1 12/2021

OTHER PUBLICATIONS

Machine translation of CN204576336 by Clarivate Analytics, Dec. 2025, 8 pages.*

(Continued)

*Primary Examiner* — Harry R Behm
(74) *Attorney, Agent, or Firm* — Seed Intellectual Property Law Group LLP

(57) ABSTRACT

The present disclosure is directed to a voltage regulation circuit receiving as input an input voltage, in particular a DC voltage supply, and outputting a regulated voltage. The voltage regulation circuit includes a voltage reference circuit configured to supply a reference voltage which is independent, in particular with respect to temperature variations. The voltage regulation circuit includes a first circuit branch and a second circuit branch in parallel coupled between the input voltage and ground. The first branch includes a current generator including a first depletion MOSFET transistor, which gate source voltage is a PTAT (Proportional To Absolute Temperature) voltage, coupled between the input voltage and the voltage reference circuit. The voltage reference circuit includes a first enhancement MOSFET transistor, which gate source voltage is a CTAT (Complementary To Absolute Temperature) voltage, coupled to the ground by its source through a source resistor, on which a reference voltage, sum of the PTAT voltage drop on the source resistor and of the gate source voltage of the enhancement MOSFET transistor being formed. The first enhancement MOSFET transistor is arranged on the first branch and coupled by the drain to the first depletion MOSFET transistor in a control node. The control node is coupled to the gate of the first enhancement MOSFET transistor. The first depletion MOSFET transistor injects a PTAT current in the first branch determining a PTAT voltage drop on the source resistor. The second branch includes an output stage coupled between the (Continued)

voltage to regulate and an output node on which the regulated voltage is taken. The output stage includes a second depletion MOSFET transistor on which output is taken at the output node. A resistive voltage divider is coupled to the output node, outputting on a respective divider output node a divided output regulated voltage which is inputted as the process variable of a negative feedback loop which is also coupled to the reference voltage. The output of the negative feedback loop controls the gate of the second MOSFET transistor.

17 Claims, 4 Drawing Sheets

(56) References Cited

U.S. PATENT DOCUMENTS

| | | | | |
|---|---|---|---|---|
| 2010/0127689 | A1* | 5/2010 | Yamamoto | G05F 3/185<br>327/537 |
| 2014/0266140 | A1 | 9/2014 | Iriarte et al. | |
| 2020/0264644 | A1* | 8/2020 | Inoue | B60R 16/03 |
| 2023/0015014 | A1* | 1/2023 | Ogura | G05F 1/575 |
| 2023/0135542 | A1* | 5/2023 | Yasusaka | G05F 3/242<br>365/226 |
| 2023/0176603 | A1* | 6/2023 | Sumitomo | G05F 1/468<br>323/313 |
| 2024/0321877 | A1* | 9/2024 | Matsumura | G05F 3/242 |

OTHER PUBLICATIONS

Bimbi et al., “Single-Branch Wide-Swing-Cascode Subthreshold GaN Monolithic Voltage Reference,” *Electronics* 2022, 11, 1840, Jun. 9, 2022. (14 pages).

Chen, “GaN Smart Power Chip Technology,” Department of Electronic and Computer Engineering, Hong Kong University of Science and Technology: pp. 403-407, 2009. (5 pages).

Hassan, A. et al., “Circuit Techniques in GaN Technology for High-Temperature Environments,” *Electronics* 2022 11(42), Dec. 23, 2021. (23 pages).

Li et al., “A Monolithically Integrated 2-Transistor Voltage Reference With a Wide Temperature Range Based on AlGaN/GaN Technology,” *IEEE Electron Device Letters* 43(3), Mar. 2022, pp. 362-365. (4 pages).

Liao et al., “A 23.6ppm/° C. Monolithically Integrated GaN Reference Voltage Design with Temperature Range from -50° C. to 200° C. and Supply Voltage Range from 3.9 to 24V,” IEEE International Solid State Circuits Conference, Hsinchu, Taiwan, Feb. 17, 2020. (3 pages).

Wong et al., “Integrated Voltage Reference Generator for GaN Smart Power Chip Technology,” *IEEE Transactions on Electron Devices* 57(4), Apr. 2010, pp. 952-955. (4 pages).

Fassio et al., “Trimming-Less Voltage Reference for Highly Uncertain Harvesting Down to 0.25 V, 5.4 pW,” *IEEE Journal of Solid-State Circuits*, 56(10), Oct. 2021, pp. 3134-3144. (11 pages).

* cited by examiner

VOLTAGE REGULATION CIRCUIT WITH AN INDEPENDENT REFERENCE VOLTAGE

BACKGROUND

Technical Field

The description relates to a voltage regulation circuit receiving as input voltage, in particular a DC (direct current) voltage supply, and outputting a regulated voltage.

Description of the Related Art

In recent years, the rise of GaN (gallium nitride) High Electron Mobility Transistor technologies have attracted interest by the power electronics designers. Nowadays, the goal is to develop fully integrated power converters with both power devices, able to maintain high voltages, and low voltage driving devices, to create a suitable driver. This may lead to several improvements in the direction to obtain lower area, lower cost, improved reliability and reduced parasitic components, due to the fewer interconnections between the driver and the power stage. This allows the exploit of all the advantages of a GaN based technology like higher breakdown voltage, operative frequency and lower on-resistance, compared to usual Power MOS devices.

To implement for instance a monolithic gate driver, several circuit blocks are utilized with a stable voltage bias, provided by voltage regulators.

To obtain a stable supply voltage, used by other parts of the circuit, voltage regulators should have a voltage reference generator which provides a low drift voltage.

Most of known architectures use the p-n junction to obtain a voltage reference and exploit all the devices based on it, from diodes to bipolar transistors. In particular, a so-called bandgap voltage reference operates on the basis of the principle of balancing in a circuit the negative temperature coefficient of a p-n junction, usually the voltage $V_{BE}$ on the base-emitter junction of a bipolar transistor, with the positive temperature coefficient of the thermal voltage $V_T$, where $V_T$=kT/q.

In GaN technology, where transistors are based on the Two-Dimensional Electron Gas (2DEG), these classic design methods cannot be applied.

In FIG. 1 by way of example to this regard a voltage regulation circuit 10 is schematically represented, which receives an input voltage, in particular a voltage supply VCC and outputs a regulated voltage, which is analog supply voltage VREG, which may be a positive voltage supply VDD, which is stabilized with respect to the input voltage, in particular voltage supply, VCC. As shown such voltages are referred to ground GND.

At the state of the art, most architectures for providing a voltage reference in circuit where p-n junctions cannot be exploited can be categorized as:

- external references such as Zener Diodes: this approach originates several problems such as limitation in frequency operation due to the parasitic components (inductors and capacitors) of the bonding wires or large temperature drifts; and
- internal references: this approach is very challenging due to the few types of components available in GaN technology such as Schottky Diodes, Si—Cr Resistors, MIM Capacitors and N-Type HEM Transistors (Depletion and Enhancement). Creating a voltage reference with low temperature drift and low line sensitivity, using these components is complex.

Also, most of the internal references use another circuit block to create a regulated voltage, available for other circuit blocks as voltage bias. This implies higher current consumption and a more complex circuit.

Also, there are several challenges in designing such circuit block, i.e., voltage regulator with voltage reference, such as:

- compensating voltage drifts due to temperature and process variables;
- loop stability;
- line sensitivity (dependency from the supply voltage); and
- load sensitivity.

BRIEF SUMMARY

Various embodiments disclosed herein provide a voltage regulation circuit with a voltage reference which solves the drawbacks of the prior art.

According to one or more embodiments, this can be achieved by means of a voltage regulation circuit having the features set forth in the discussion that follows.

The present disclosure describes solutions regarding a voltage regulation circuit receiving an input voltage, in particular a DC voltage supply, and outputting a regulated voltage,

- comprising a voltage reference circuit configured to supply a reference voltage which is independent, in particular with respect to temperature variations,
- said voltage regulation circuit comprising a first circuit branch and a second circuit branch in parallel coupled between said input voltage and ground,
- said first branch comprising
  - a current generator comprising a first depletion MOSFET transistor, which gate source voltage is a PTAT (Proportional To Absolute Temperature) voltage, coupled between said input voltage and the voltage reference circuit,
  - said voltage reference circuit comprising a first enhancement MOSFET transistor, which gate source voltage is a CTAT (Complementary To Absolute Temperature) voltage, coupled to the ground by its source through a source resistor, on which a reference voltage, sum of the PTAT voltage drop on the source resistor and of the gate source voltage of the enhancement MOSFET transistor being formed, said first enhancement MOSFET transistor being arranged on said first branch and coupled by the drain to said first depletion MOSFET transistor in a control node, said control node being coupled to the gate of said first depletion MOSFET transistor,
  - said first depletion MOSFET transistor injecting a PTAT current in said first branch determining a PTAT voltage drop on said source resistor,
  - said second branch comprising an output stage coupled between said voltage to regulate and an output node on which said regulated voltage is taken, said output stage comprising a second MOSFET transistor on which output is taken said output node, a resistive voltage divider being coupled to said output node, outputting on a respective divider output node a divided output regulated voltage which is inputted as the process variable of a negative feedback loop which is also coupled to said reference voltage, the output of said negative feedback loop controlling the gate of said second MOSFET transistor.

In variant embodiments, in said output stage coupled between said voltage to regulate and an output node on which said regulated voltage is taken said second MOSFET transistor is coupled to the gate of the first depletion MOSFET transistor, said negative feedback loop comprising a coupling of said divider output node of said resistive voltage divider to a gate of said first enhancement MOSFET transistor on which a reference voltage, sum of the PTAT voltage drop on the source resistor and of the gate source voltage of the enhancement MOSFET transistor, is formed.

In variant embodiments, said enhancement MOS transistor is cascoded with a second enhancement MOSFET transistor, the gate of said first enhancement MOSFET transistor being coupled to ground by a first resistor of the voltage divider, the gate of the second enhancement MOSFET transistor being coupled to said first resistor by a second resistor and to the output node by a third resistor.

In variant embodiments, said first depletion MOSFET transistor has its gate coupled to its source through a resistor and coupled to the drain of the first enhancement MOSFET transistor, through said second enhancement MOSFET transistor.

In variant embodiments, said first depletion MOS transistor and second MOSFET transistor are cascoded by respective third and fourth depletion transistors, in particular said third depletion transistor being interposed between the voltage to regulate and the first depletion MOS transistor with its gate coupled to the source of the first depletion MOSFET transistor, and the fourth depletion transistor being coupled between the voltage to regulate and the second MOSFET transistor with its gate coupled to the source of the second MOSFET transistor.

In variant embodiments, said gates of the first depletion MOSFET transistor and second transistor are coupled to ground by a capacitor.

In variant embodiments, said negative feedback loop comprises a differential amplifier which inputs are coupled to said divider output node and to said control node, said first enhancement MOSFET transistor having its gate coupled to its drain, the output of said differential amplifier being coupled to the gate of said second transistor.

In variant embodiments, said depletion n-type MOSFET transistors and enhancement n-type MOSFET transistor are obtained by Gallium Nitride technology, in particular are GaN High Electron Mobility Transistor.

In embodiments said second MOSFET transistor is a second depletion MOSFET transistor.

In embodiments the solution here described regards also a voltage regulation circuit receiving an input voltage, in particular a DC voltage supply, and outputting a regulated voltage, comprising a voltage reference circuit configured to supply a reference voltage which is independent, in particular with respect to temperature variations, said voltage regulation circuit comprising a first circuit branch and a second circuit branch in parallel coupled between said input voltage and ground, comprising said first branch comprising a current generator comprising a first depletion MOSFET transistor, which gate source voltage is a PTAT (Proportional To Absolute Temperature) voltage, coupled between said input voltage and the voltage reference circuit, said voltage reference circuit comprising a first enhancement MOSFET transistor, which gate source voltage is a CTAT (Complementary To Absolute Temperature) voltage, coupled to the ground by its source through a source resistor, said first depletion MOSFET transistor injecting a PTAT current in said first branch determining a PTAT voltage drop on said source resistor, said second branch comprising an output stage coupled between said voltage to regulate and an output node on which said regulated voltage is taken, said output stage comprising a second MOSFET transistor, in particular a depletion MOSFET, coupled to the gate of the first depletion MOSFET transistor, said output node being coupled through a resistive voltage divider to a gate of said first enhancement MOSFET transistor on which a reference voltage, sum of the PTAT voltage drop on the source resistor and of the gate source voltage of the enhancement MOSFET transistor is formed.

BRIEF DESCRIPTION OF THE SEVERAL VIEWS OF THE DRAWINGS

One or more embodiments will now be described, by way of example, with reference to the annexed figures wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
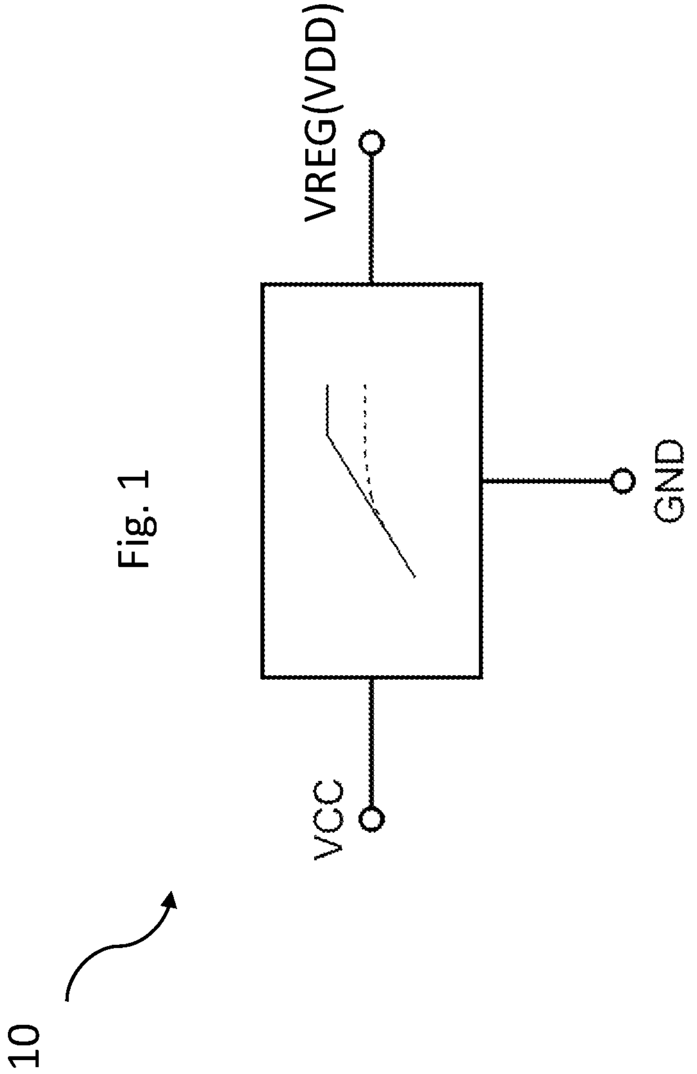
FIG. 1 is a voltage regulation circuit.
Figure 2:
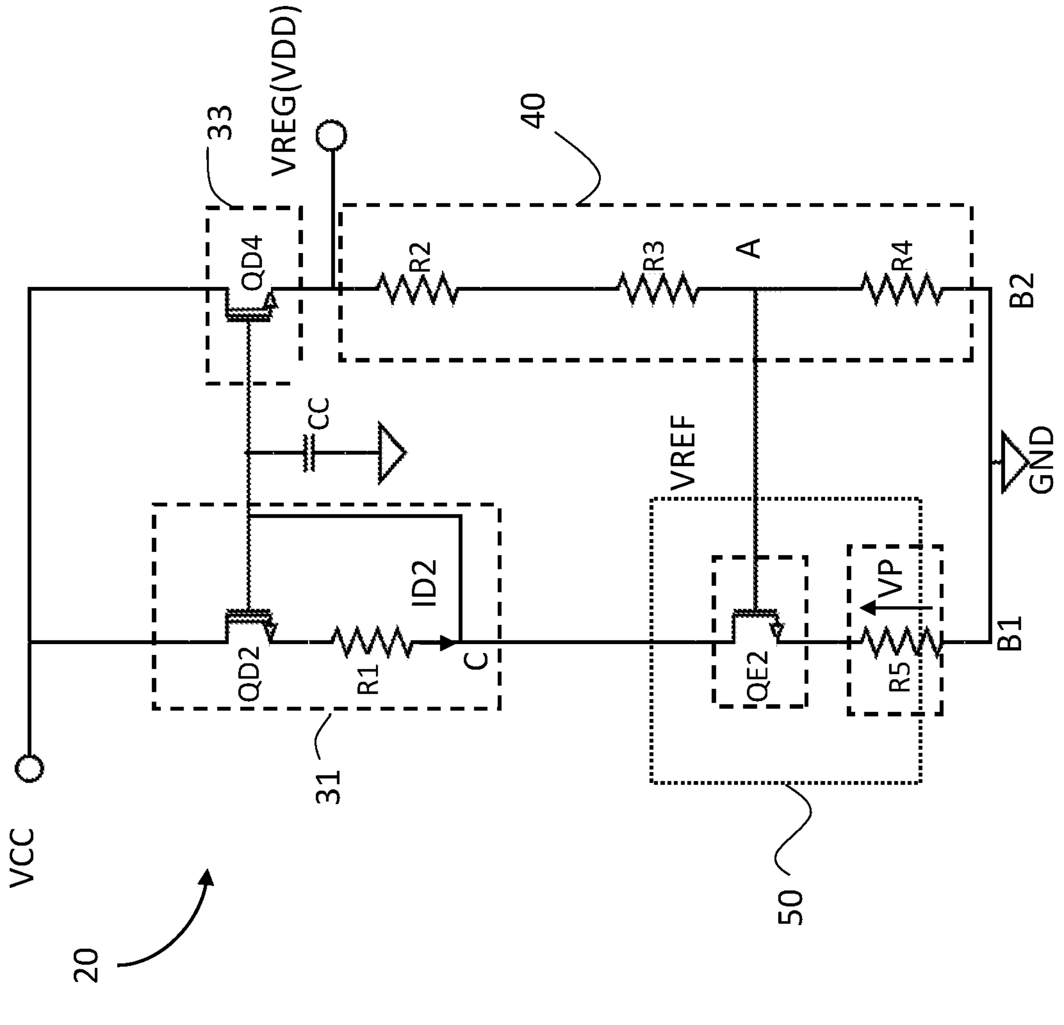
FIG. 2 is a circuit diagram of a voltage regulation circuit according to embodiments.

In FIG. 2 it is shown a circuit diagram representing a voltage regulator circuit 20.

Such voltage regulator circuit 20 receives as input voltage, a DC voltage supply VCC, and supplies at an output node REG a regulated voltage VREG, which is regulated to take in account variation determined by a load coupled to the output node REG and also for possible variations of the input voltage VCC. The regulated voltage VREG may in embodiments correspond to an analog voltage supply VREG, for instance of a gate driver in GaN technology.

As shown such voltage regulation circuit 20 comprises, indicated as a whole with 50, a voltage reference circuit configured to supply a reference voltage VREF, which is independent, in particular with respect to temperature variations. In particular the voltage reference circuit 50 here described is configured to behave in a manner similar in some respects to a bandgap reference circuit, in particular in that provides components with negative temperature coefficient and components with positive temperature coefficient.

Then, the voltage regulation circuit 20 comprises a current generator circuit 31 and an output stage 33. The current generator circuit 31 is coupled at its input to the input voltage VCC. The divider circuit 40 is coupled by a divider output node A of the divider circuit 40, i.e., the node on which the divided voltage is taken, in particular in the example between resistors R3 and resistor R4, to the voltage reference circuit 50, which is also coupled by a control node C to such current generator circuit 31. The voltage regulation circuit 20 comprises a first circuit branch B1 and a second circuit branch B2 in parallel, each coupled between said input voltage VCC and ground GND.

On the first branch B1 is arranged, coupled to the input voltage VCC, such current generator circuit 31 comprising a first depletion n-type, i.e., with n channel operating in depletion mode, MOSFET QD2, which drain is coupled to the input voltage VCC and which source is coupled to a source resistor R1. Thus, a current ID2 equal to (−VGS (QD2))/R1, where VGS(QD2) is the gate source voltage of the first depletion n-type MOSFET QD2, flows into the first branch B1, specifically into an enhancement MOSFET QE2 and in particular, into a resistor R5.

The voltage reference circuit 50 indeed comprises, on the first branch B1 a first enhancement n-type, i.e., n channel operating in enhancement mode, MOSFET transistor QE2, which is coupled to ground GND by its source through a source resistor R5 and it is coupled by its drain to a control node C.

The second circuit branch B2, comprises a second depletion n-type MOSFET transistor QD4, which is coupled at its drain to the input voltage VCC, while on its source, the output node REG, outputs the regulated voltage VREG. The second depletion n-type MOSFET transistor QD4 and the first depletion n-type MOSFET QD2 have their gates coupled together and coupled to the control node C. The second depletion n-type MOSFET transistor QD4 can be also defined as a pass transistor. Such gate electrodes are coupled to ground GND through a compensation capacitor CC. As mentioned, in variant embodiments, the second depletion n-type MOSFET transistor QD4 may be substituted by an enhancement n-type MOSFET transistor.

The second depletion n-type MOSFET transistor QD4 represents the output stage 33, with its gate operating as the control input coupled to the control node C and the output on the source, corresponding to output node REG. The output of the current generator 31 thus may be considered as corresponding to the drain of enhancement MOSFET transistor QE1, i.e., node C, which represents the input of the output stage 33, which output, the output node REG, outputs the regulated voltage VREG.

A voltage divider circuit 40 is then provided on the second branch B2 between the source of the second depletion n-type MOSFET transistor QD4, i.e., the regulated output node REG, and ground GND. The voltage divider 40 comprises three resistors in series, R2, R3, R4. The resistor R2 is coupled to the regulated output node REG on which the regulated voltage VREG is taken. The resistor R4 is coupled to ground GND. The node in common between resistor R3 and resistor R4 is coupled to the divider output node A on which the reference voltage VREF is obtained.

Thus, the proposed architecture embeds the voltage reference and the voltage regulator in one circuit, using the voltage reference circuit 50 as part of a feedback network to regulate the output voltage VREG.

As indicated, in the circuit of FIG. 2, there are two types of N-type transistors:

- depletion QD, e.g., QD2, QD4, which gate-source voltage are PTAT (proportional to absolute temperature); and
- enhancement QE, e.g., QE2, which gate-source voltage are CTAT (Complementary to absolute temperature).

Thus, a current ID2 equal to (−VGS(QD2))/R1 flows into the first circuit branch B1, creating a PTAT voltage drop VP on resistor R5 equal to ID2*R5=−VGS(QD2)*R5/R1, since its proportionality with the gate-source voltage of the first depletion n-type MOSFET transistor QD2. The value of resistance of the resistor R1 on the source of the first depletion n-type MOSFET transistor QD2 is selected to obtain a desired valued of bias current. The reference voltage VREF is obtained at the gate of MOSFET QE2 coupled to the divider output node A, as sum of the voltage drop VP across such resistor R5 and the gate source voltage on first enhancement n-type MOSFET QE2, VGS(QE2), which is CTAT, as said. Thus, the voltage reference circuit 50 substantially comprises the first enhancement n-type MOSFET QE2 supplying a CTAT contribution by its gate source voltage VGS(QE2) and the voltage drop VP on the resistor R5, which is originated by the current of the generator 31 comprising the PTAT first depletion n-type MOSFET transistor QD2. The reference voltage VREF is also a fixed potential in the voltage divider 40. So, the regulated voltage VREG is obtained as:

$$VREG=((R2+R3+R4)/R4)*VREF=((R2+R3+R4)/R4)*(VGS(QE2)+(-VGS(QD2)\cdot R5/R1)$$

Thus the CTAT contribution and the PTAT contribution originated by the current ID2 of the current generator 31 compensate one with the other. The ratio of resistor R5 to resistor R1 may be set to nullify any temperature dependence.

In the second branch B2, QD4 represents the output transistor of the regulator, generating the regulated voltage VREG, while as said R2, R3 and R4 act as a voltage divider 40 and negative feedback network, biasing the gate voltages of the enhancement MOSFET QE2. In particular, variations, e.g., of current drawn by the load at the output node REG on the second branch B2 are by this arrangement brought back on the first branch B1 by controlling, through the divider 40, the biasing of the gate of the enhancement MOSFET QE2, which varies the current flowing in the first branch B1, and thus the voltage of the control node C, which also is coupled, in particular directly in the embodiment shown, to the gate of the output MOSFET QD4, controlling thus its output, the regulated voltage VREG. In other words, if the regulated voltage VREG decreases, due to an increasing of the load current, the gate voltage of the enhancement MOSFET QE2 is pulled down through the resistor divider, reducing the conduction of MOSFET QE2 itself, then, the voltage of the control node C is pulled up as well as the gate voltage of the output MOSFET QD4, which consequently increases the regulated voltage VREG, restoring the regime condition. The reference voltage VREF may undergo a transient variation during the adjustment of the regulated voltage VREG, but in any case returns to its value at regime.

Figure 3:
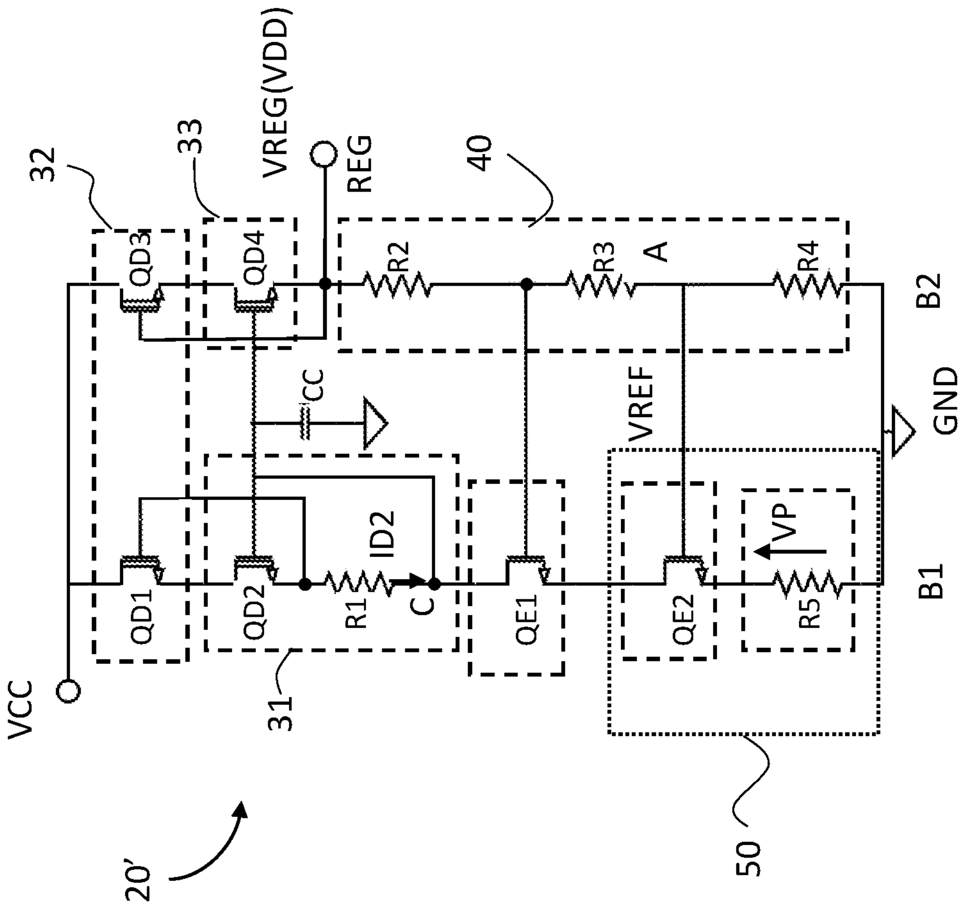
FIG. 3 is a circuit diagram of a voltage regulation circuit according to first further embodiments.

In FIG. 3 it is shown an embodiment 20' of the voltage regulator circuit which further comprise cascode protection, in particular it comprises also a protection cascode circuit 32, formed by depletion MOSFET transistors QD1 and QD3. The current generator circuit 31 is coupled at its input to the input voltage VCC, in particular through the protection cascode circuit 32.

On the first branch B1 such current generator circuit 31 is arranged, coupled to the input voltage VCC, and comprising the first depletion n-type, MOSFET QD2, which drain is coupled to the input voltage VCC and which source is coupled to a source resistor R1. In the embodiment shown, where the cascode 32 is interposed, the drain of the MOSFET is coupled to the input voltage VCC by being coupled to the source of the MOSFET QD1 which drain in its turn is coupled to the input voltage VCC.

In the second circuit branch B2, the second depletion n-type MOSFET transistor QD4 is coupled at its drain to the input voltage VCC through the protection cascode circuit 32, while on its source, the output node REG, outputs the regulated voltage VREG. The second depletion n-type MOSFET transistor QD4 and the first depletion n-type MOSFET QD2 have their gates coupled together and coupled to the control node C. Such gate electrodes are coupled to ground GND through a compensation capacitor CC. Thus, the drains of the two gate coupled depletion n-type MOSFETS QD2 and QD4 are coupled to the input voltage VCC through a protective cascode, i.e., a depletion n-type MOSFET QD1 with the gate coupled to the source of first depletion n-type MOSFET transistor QD2, the source coupled to the drain of the first depletion n-type MOSFET transistor QD2 and the drain coupled to the supply voltage VCC, and a depletion n-type MOSFET QD3, with the gate coupled to the source of the depletion n-type MOSFET transistor QD4, the source coupled to the drain of the second depletion n-type MOSFET transistor QD4 and the drain coupled to the regulated voltage VCC.

Depletion MOSFET transistors QD1 and QD3 are thus used as cascode configuration with the respective transistors QD2 and QD4 to improve the power supply rejection and, therefore, extend the supply voltage range.

Also, an enhancement MOSFET QE1 is used as cascode to decrease the voltage tracking of the reference voltage VREF. To this regard, the voltage reference circuit 50 therefore comprises, on the first branch B1 the first enhancement n-type MOSFET transistor QE2, which is coupled to ground GND by its source through a source resistor R5 and in FIG. 2 it is coupled by its drain to the control node C. As mentioned, the circuit 20' includes a further cascode configuration, i.e., an enhancement n-type MOSFET QE1 is coupled by the drain to the control node C, while its gate is coupled to the common node of resistors R2 and R3 and its source is coupled to the drain of the first enhancement n-type MOSFET QE2, which gate is coupled to the divider output node A on which the reference voltage VREF is obtained and its source is coupled through the source resistor R5 to ground GND.

In the voltage regulator circuit 20', in the second branch B2, MOSFET QD4 still represents the output transistor of the regulator, generating the regulated voltage VREG, while as said R2, R3 and R4 act as a voltage divider 40 and negative feedback network, biasing the gate voltages of the enhancement MOSFETS QE1 and QE2. In particular, the second depletion n-type MOSFET transistor QD4 still represents the output stage 33, with its gate operating as the control input coupled to node C and the output on the source, corresponding to output node REG. The output of the current generator 31 thus may be considered as corresponding to the drain of enhanced MOSFET transistor QE1, i.e., node C, which represents the input of the output stage 33, which output, the output node REG, outputs the regulated voltage VREG.

The compensation capacitor CC guarantees the closed loop stability.

The exemplary voltage regulator circuits 20 or 20' provide an average 6 V voltage, with low line sensitivity and low temperature spread.

The voltage regulator circuits 20 and 20' are more suitable for small oscillations of the voltage to be regulated.

Figure 4:
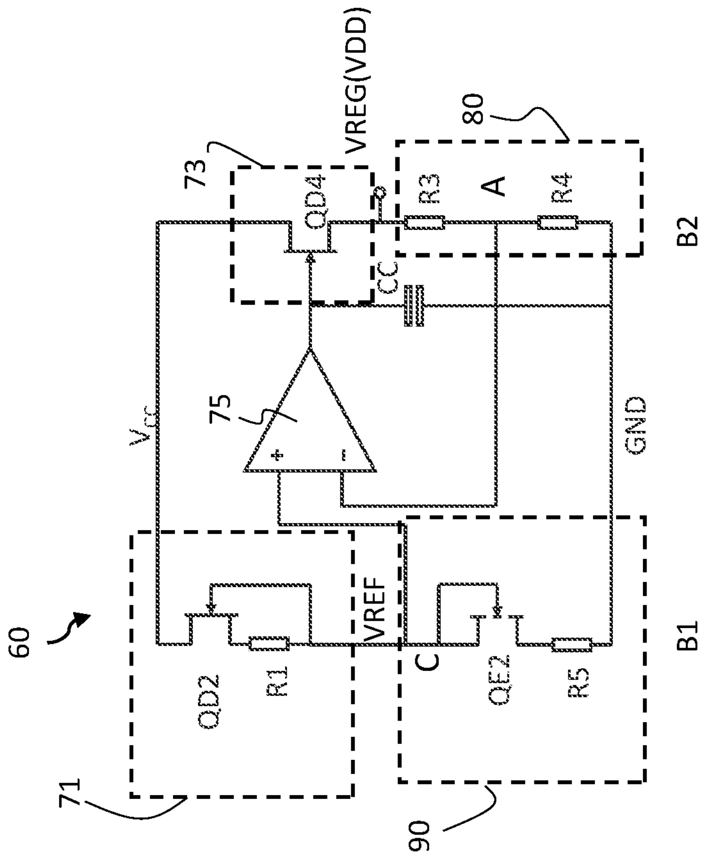
FIG. 4 is a circuit diagram of a voltage regulation circuit according to second further embodiments.

In FIG. 4 it is shown a further embodiment, indicated with 60, of the voltage regulator circuit here described, which is more suitable to regulate higher oscillations, by way of example it may be used to regulate supply rails for high current switching loads.

The first branch B1 is substantially similar to the one of embodiments 20, 20' in that comprises a current generator circuit 71 comprising the first depletion n-type, i.e., with n channel operating in depletion mode, MOSFET QD2, which drain is coupled to the input voltage VCC and which source is coupled to a source resistor R1. The other end of the resistor is coupled to the control node C.

The voltage regulator circuit 60 comprises a voltage reference circuit 90, which analogously to the voltage reference circuit 50 indeed comprises, on the first branch B1 the first enhancement n-type, i.e., n channel operating in enhancement mode, MOSFET transistor QE2, which is coupled to ground GND by its source through the source resistor R5 and it is coupled by its drain to the control node C.

However, in this case the control node C, i.e., the drain of the MOSFET transistor QE2, is short-circuited to its gate, so that the reference voltage VREF forming on such gate it is also present on its drain, i.e., on the control node C.

Also in this case the second depletion n-type MOSFET transistor QD4 represents the output stage 33, with its gate operating as the control input. However, as shown in FIG. 4, a differential amplifier 75 is arranged with its positive input coupled to the control node C, i.e., receiving as input the reference voltage VREF. A voltage divider circuit 80 is then provided on the second branch B2 between the source of the second depletion n-type MOSFET transistor QD4, i.e., the regulated output node REG, and ground GND. The voltage divider 80 comprises two resistors in series, R3, R4, i.e., in this case a resistor R2 is not shown, although of course it can be considered comprised in the resistor R3, in particular if R2 represents the source resistor of stage 33. The resistor R3 is thus in this case coupled to the regulated output node REG on which the regulated voltage VREG is taken. The resistor R4 is coupled to ground GND. The node in common between resistor R3 and resistor R4 is also labelled as node A, although in this case is not coupled directly to the gate of the first enhancement n-type MOSFET transistor QE2, but it is coupled to the negative input of the differential amplifier 75. The output of the differential amplifier 75 is coupled to the gate of the second depletion n-type MOSFET transistor QD4.

Thus, here the reference voltage VREF is generated in the same way, i.e., by circuit 90 on the gate of QE2, however this reference voltage VREF is not coupled to the divider node A, but it is coupled to the control node C which is one of the two inputs of the differential amplifier, the other one receiving the voltage on the divider node A, i.e., VREG*R4/(R3+R4). Therefore the second depletion n-type MOSFET transistor QD4 is driven by the difference, or error, between the reference voltage VREF and the regulated voltage VREG, in particular divided by the ratio value of the divider 80, e.g., R4/(R3+R4). The regulated voltage VREG is the same as described for the other embodiments, or course minus the R2 resistance:

$$VREG = ((R3 + R4)/R4) * VREF = ((R3 + R4)/R4) * (VGS(QE2) + (-VGS(QD2) \cdot R5/R1),$$

The regulated voltage obtained is proportional to the divided ratio multiplied by the reference voltage, which is set by the difference of the gate source voltage of the enhancement MOSFET on branch B1 to the gate source voltage of the depletion MOSFET, divided by the ratio of the resistance of their source resistor, e.g., R5 and R1.

Figure 5:
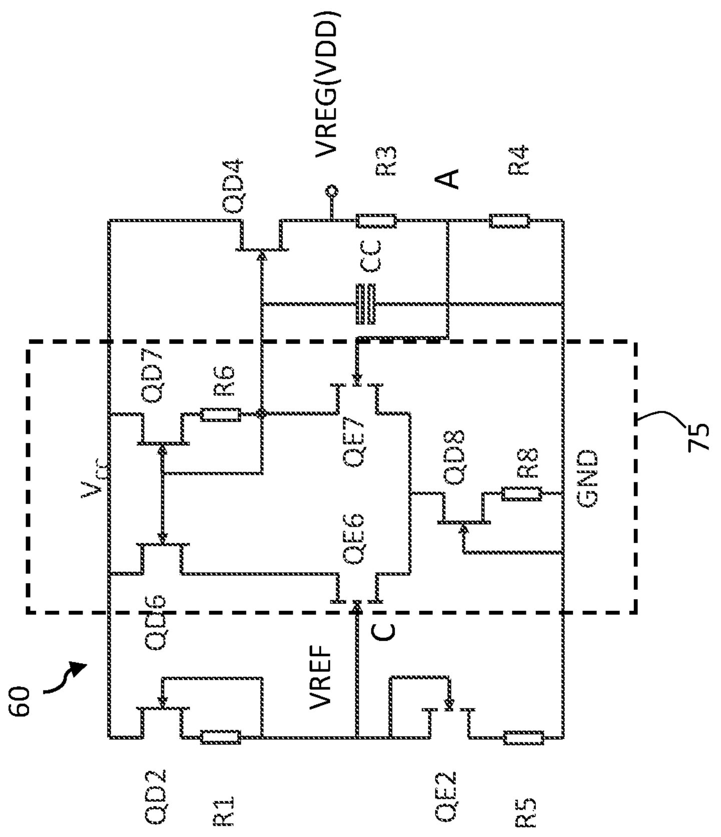
FIG. 5 is a circuit diagram of an implementation of the voltage regulation circuit of FIG. 4.

In FIG. 5 it is shown a circuit diagram explicating also the implementation of the differential amplifier 75, which comprises an input pair of enhancement MOSFET QE6 and QE7, coupled to inputs, i.e., nodes C and A, which sources are coupled to a current generator, i.e., depletion MOSFET QD8, with a source resistor R8, in order to bias the input pair, QE6, QE7. The pair of enhancement MOSFET QE6 and QE7 is also coupled to the supply voltage by a circuit arrangement in which their drains are coupled to the sources of respective depletion MOSFETS QD6, QD7, coupled by the drain to the supply voltage VCC, MOSFET QD7 having the gate coupled to the gate of QD4. The source of the MOSFET QD7 is coupled to the gate of the MOSFET QD4 through a resistor R6. The current in the two branches is fixed by the current generator corresponding to the MOSFET QD7 and the resistor R6 which supplies a given current value and by the current generator corresponding to the MOSFET QD8 with the resistor R8, which supplies a current which is the double in value of the current fixed by the MOSFET QD7.

The use of the differential amplifier receiving the reference voltage VREF and a voltage proportional to the regulated voltage VREG allows to handle higher oscillations, e.g., when higher loads are coupled to the regulated voltage node REG.

Also in this case therefore the regulated voltage is fed back by a divider while the reference voltage is set by an enhancement MOSFET QE2, which gate-source voltage are CTAT (Complementary To Absolute Temperature), the input circuit 71 on the same branch, B1, comprising a CTAT depletion MOSFET, QD2.

Also in this case, the gate electrode of the second depletion n-type MOSFET transistor QD4 is coupled to ground GND through a compensation capacitor CC. Also in this case in variant embodiments the MOSFET QD4 can be an enhancement MOSFET instead of a depletion MOSFET:

Thus, in general the voltage regulation circuit here described comprising:

a voltage reference circuit, such as 50 or 90, configured to supply the reference voltage (REF) which is independent, in particular with respect to temperature variations, and a first circuit branch B1 and a second circuit branch B2 in parallel coupled between said input voltage VCC and ground GND, said first branch B1 comprising:

a current generator, e.g., 31, 71 comprising a first depletion MOSFET transistor QD2, which gate source voltage is a PTAT Proportional To Absolute Temperature voltage, coupled between the input voltage VCC and the voltage reference circuit, 50 or 90, such voltage reference circuit 50 or 90, comprising a first enhancement MOSFET transistor, e.g., QE2, which gate source voltage is a CTAT (Complementary To Absolute Temperature) voltage, coupled to the ground GND by its source through a source resistor R5, on which the reference voltage (VREF), sum of the PTAT voltage drop VP on the source resistor R5 and of the gate source voltage VGS(QE2) of the enhancement MOSFET transistor QE2 is formed, the first enhancement MOSFET transistor QE2 being arranged on said first branch B1 and coupled by the drain to the first depletion MOSFET transistor QD2 in a control node C, which is coupled to the gate of said first enhancement MOSFET transistor QE2, and the first depletion MOSFET transistor QD2 injecting a PTAT current ID2 in the first branch B1, in particular in the control node C, determining a PTAT voltage drop VP on the source resistor, e.g., R5, and the second branch B2 comprising an output stage, 33, 73, coupled between the voltage to regulate VCC and an output node REG on which the regulated voltage VREG is taken, the output stage, 33, 73, comprising a second MOSFET transistor QD4, in particular a depletion MOSFET, on which output is taken said output node REG, a resistive voltage divider, 40, 80 being coupled to said output node REG, outputting on a respective divider output node A a divided output regulated voltage, e.g., R4/(R2+R3+R4) or R4/(R3+R4), which is inputted as the process variable of a negative feedback loop, which comprises, e.g., MOSFET QE2 or differential amplifier 75, and which is also coupled to said reference voltage VREF, the output of said negative feedback loop controlling, i.e., driving by setting its control voltage, the gate of such second MOSFET transistor QD4.

For process variable is intended the variable in a negative feedback loop which is the current measured value of a particular part of a process which is being monitored or controlled.

In the embodiments of FIG. 2,3, the MOSFET QE2, which set the reference voltage VREF, has also the function of controlling the gate of the output MOSFET QD4 in a negative feedback loop. The variation of the (divided) voltage VREG is fed back to control the gate of the second MOSFET transistor QD4 through its action on the MOSFET QE2, which is also coupled, in this case sets, the reference voltage VREF. The gate is controlled by the difference of the divided regulated voltage and the reference voltage REF.

Thus, in the voltage regulator, 20, 20', of FIGS. 2,3 in the output stage 33 coupled between the voltage to regulate VCC and an output node, REG, on which such regulated voltage VREG is taken, such second MOSFET transistor, QD4, is coupled to the gate of the first depletion MOSFET transistor QD2, in particular to the control node C, while the negative feedback loop comprises a coupling of the divider output node A of the resistive voltage divider 40 to a gate of the first enhancement MOSFET transistor QE2 on which the reference voltage VREF sum of the PTAT voltage drop VP on the source resistor R5 and of the gate source voltage VGS(QE2) of the enhancement MOSFET transistor (QE2), is formed.

In other words, with more detail of the couplings of the components, in FIGS. 2 and 3 it is described a voltage regulation circuit, 20; 20' receiving as input an input voltage, VCC, in particular a DC voltage supply, and outputting a regulated voltage VREG, comprising a voltage reference circuit, 50, configured to supply a reference voltage, VREF, which is independent, in particular with respect to temperature variations, and said voltage regulation circuit, 20; 20', comprising a first circuit branch, B1, and a second circuit branch, B2, in parallel coupled between said input voltage, VCC, and ground, GND, comprising:

said first branch, B1, comprising:

a current generator, 31, comprising a first depletion MOSFET transistor, QD2, which gate source voltage is a PTAT (Proportional To Absolute Temperature) voltage, coupled between said input voltage, VCC, and the voltage reference circuit, 50, said voltage reference circuit, 50, comprising a first enhancement MOSFET transistor, QE2, which gate source voltage is a CTAT (Complementary To Absolute Temperature) voltage, coupled to the ground, GND, by its source through a source resistor, R5, said first depletion MOSFET transistor, QD2, injecting a PTAT current, ID2, in said first branch, B1, determining a PTAT voltage drop, VP, on said source resistor, R5), said second branch, B2, comprising an output stage, 33, coupled between said voltage to regulate, VCC, and an output node on which said regulated voltage, VREG, is taken, said output stage comprising a second MOSFET transistor, QD4, in particular a depletion MOSFET, coupled to the gate of the first depletion MOSFET transistor, QD2, and said output node, REG, being coupled through a resistive voltage divider, 40, to a gate, A, of said first enhancement MOSFET transistor, QE2, on which a reference voltage, VREF, sum of the PTAT voltage drop, VP, on the source resistor, R5, and of the gate source voltage, VGS(QE2), of the enhancement MOSFET transistor, QE2, is formed.

In the embodiment of FIGS. 4,5, wherein the negative feedback loop comprises a differential amplifier 75 which inputs are coupled to such divider output node A and to said control node C, said first enhancement MOSFET transistor QE2, having its gate coupled to its drain, the output of such differential amplifier 75, being coupled to the gate of such second depletion transistor QD4.

From the description here above are clear the advantages of the solution here described.

The voltage regulator according to the solution here described, using the described circuital arrangement exploiting depletion and enhancement n-channel MOSFETs, obtains a regulation with a voltage reference which has low line sensitivity and low temperature spread.

The circuit described obtains also advantages in the terms of power consumption, area consumption, cost saving, with respect to the known solution.

Without prejudice to the underlying principles, the details and the embodiments may vary, even significantly, with respect to what has been described by way of example, without departing from the scope of protection.

The depletion n-type MOSFET transistors and enhancement n-type MOSFET transistor are obtained by Gallium Nitride technology, in particular are GaN High Electron Mobility Transistor, although it may be used with transistor using other hetero-junctions, for example GaAs and AlGaAs, or also with other compatible transistor technologies.

A voltage regulation circuit (20;20';60) receiving as input an input voltage (VCC), in particular a DC voltage supply, and outputting a regulated voltage (VREG), may include a voltage reference circuit (50;90) configured to supply a reference voltage (VREF) which is independent, in particular with respect to temperature variations, said voltage regulation circuit (20;20';60) comprising a first circuit branch (B1) and a second circuit branch (B2) in parallel coupled between said input voltage (VCC) and ground (GND), said first branch (B1) comprising a current generator (31; 71) comprising a first depletion MOSFET transistor (QD2), which gate source voltage is a PTAT (Proportional To Absolute Temperature) voltage, coupled between said input voltage (VCC) and the voltage reference circuit (50; 90), said voltage reference circuit (50;90) comprising a first enhancement MOSFET transistor (QE2), which gate source voltage is a CTAT (Complementary To Absolute Temperature) voltage, coupled to the ground (GND) by its source through a source resistor (R5), on which a reference voltage (VREF), sum of the PTAT voltage drop (VP) on the source resistor (R5) and of the gate source voltage (VGS(QE2)) of the enhancement MOSFET transistor (QE2) being formed, said first enhancement MOSFET transistor (QE2) being arranged on said first branch (B1) and coupled by the drain to said first depletion MOSFET transistor (QD2) in a control node (C), said control node (C) being coupled to the gate of said first enhancement MOSFET transistor (QE2), said first depletion MOSFET transistor (QD2) injecting a PTAT current (ID2) in said first branch (B1) determining a PTAT voltage drop (VP) on said source resistor (R5), said second branch (B2) comprising an output stage (33; 73) coupled between said voltage to regulate (VCC) and an output node (REG) on which said regulated voltage (VREG) is taken, said output stage (33) comprising a second MOSFET transistor (QD4), in part on which output is taken said output node (REG), a resistive voltage divider (40; 80) being coupled to said output node (REG), outputting on a respective divider output node (A) a divided output regulated voltage (VREG) which is inputted as the process variable of a negative feedback loop (QE2; 75) which is also coupled to said reference voltage (VREF), the output of said negative feedback loop (QE2; 75) controlling the gate of said second MOSFET transistor (QD4).

The output stage (33) may be coupled between said voltage to regulate (VCC) and an output node on which said regulated voltage (VREG) is taken said second MOSFET transistor (QD4) is coupled to the gate of the first depletion MOSFET transistor (QD2), said negative feedback loop (QE2; 75) comprising a coupling of said divider output node (A) of said resistive voltage divider (40) to a gate of said first enhancement MOSFET transistor (QE2) on which a reference voltage (VREF), sum of the PTAT voltage drop (VP) on the source resistor (R5) and of the gate source voltage (VGS(QE2)) of the enhancement MOSFET transistor (QE2), is formed.

The enhancement MOS transistor (QE2) may be cascoded with a second enhancement MOSFET transistor (QE1), the gate of said enhancement MOSFET transistor (QE2) being coupled to ground by a first resistor (R4) of said voltage divider (40), the gate of the second enhancement MOSFET transistor (QE1) being coupled to said first resistor (R4) by a second resistor (R3) and to the output node by a third resistor (R2).

The first depletion MOSFET transistor (QD2) may have its gate coupled to its source through a resistor (R1) and coupled to the drain of the first enhancement MOSFET transistor (QE2), in particular through said second enhancement MOSFET transistor (QE1).

The first depletion MOS transistor (QD2) and second MOSFET transistor (QD4) may be cascaded by respective third (QD1) and fourth depletion transistors (QD3), in particular said third depletion transistor being interposed between the voltage to regulate (VCC) and the first depletion MOS transistor with its gate coupled to the drain of the first depletion MOSFET transistor (QD2), and the fourth depletion transistor (QD3) being coupled between the voltage to regulate (VCC) and the second MOSFET transistor (QD4), with its gate coupled to the source of the second MOSFET transistor (QD4).

The gates of the first depletion MOSFET transistor (QD2) and second transistor (QD4) may be coupled to ground by a compensation capacitor (CC).

The negative feedback loop may include a differential amplifier (75) which inputs are coupled to said divider output node (A) and to said control node (C), said first enhancement MOSFET transistor (QE2) having its gate coupled to its drain, the output of said differential amplifier (75) being coupled to the gate of said second depletion transistor (QD4).

The depletion n-type MOSFET transistors and enhancement n-type MOSFET transistor may be obtained by Gallium Nitride technology, in particular are GaN High Electron Mobility Transistor.

The second MOSFET transistor (QD4) may be a second depletion MOSFET transistor.

A voltage regulation circuit (20; 20') receiving as input an input voltage (VCC), in particular a DC voltage supply, and outputting a regulated voltage (VREG), may include a voltage reference circuit (50) configured to supply a reference voltage (VREF) which is independent, in particular with respect to temperature variations said voltage regulation circuit (20; 20') comprising a first circuit branch (B1) and a second circuit branch (B2) in parallel coupled between said input voltage (VCC) and ground (GND), comprising said first branch (B1) comprising a current generator (31) comprising a first depletion MOSFET transistor (QD2), which gate source voltage is a PTAT (Proportional To Absolute Temperature) voltage, coupled between said input voltage (VCC) and the voltage reference circuit (50) said voltage reference circuit (50) comprising a first enhancement MOSFET transistor (QE2), which gate source voltage is a CTAT (Complementary To Absolute Temperature) voltage, coupled to the ground (GND) by its source through a source resistor (R5), said first depletion MOSFET transistor (QD2) injecting a PTAT current (ID2) in said first branch (B1) determining a PTAT voltage drop (VP) on said source resistor (R5), said second branch (B2) comprising an output stage (33) coupled between said voltage to regulate (VCC) and an output node on which said regulated voltage (VREG) is taken, said output stage comprising a second MOSFET transistor (QD4), in particular a depletion MOSFET, coupled to the gate of the first depletion MOSFET transistor (QD2), said output node (REG) being coupled through a resistive voltage divider (40) to a gate (A) of said first enhancement MOSFET transistor (QE2) on which a reference voltage (VREF), sum of the PTAT voltage drop (VP) on the source resistor (R5) and of the gate source voltage (VGS(QE2)) of the enhancement MOSFET transistor (QE2) is formed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voltage regulation circuit, comprising:

a first circuit branch and a second circuit branch in parallel and coupled between an input voltage and ground, the first circuit branch including a current generator including a first depletion MOSFET transistor, which gate source voltage is a Proportional To Absolute Temperature (PTAT) voltage, the input voltage being a direct current (DC) voltage supply;

a voltage reference circuit configured to supply a reference voltage that is independent with respect to temperature variations, the first depletion MOSFET transistor being coupled between the input voltage and the voltage reference circuit, the voltage reference circuit including a first enhancement MOSFET transistor, which gate source voltage is a Complementary To Absolute Temperature (CTAT) voltage, a source of the first enhancement MOSFET transistor being coupled to the ground through a source resistor, the reference voltage, which is a sum of the PTAT voltage drop on the source resistor and the gate source voltage of the first enhancement MOSFET transistor, being formed on the first enhancement MOSFET transistor, the first enhancement MOSFET transistor being arranged on the first circuit branch, a drain of the first enhancement MOSFET transistor being coupled to the first depletion MOSFET transistor through a control node, the control node being coupled to a gate of the first depletion MOSFET transistor, the first depletion MOSFET transistor configured to inject a PTAT current in the first circuit branch that determines a PTAT voltage drop on the source resistor, the second circuit branch including an output stage coupled between the input voltage and an output node on which a regulated voltage is output, the output stage including a MOSFET transistor, the MOSFET transistor of the output stage is coupled to a gate of the first depletion MOSFET transistor; and a resistive voltage divider coupled to the output node, the resistive voltage divider configured to output, on a divider output node, a divided output regulated voltage that is input as a process variable of a negative feedback loop coupled to the reference voltage, an output of the negative feedback loop controlling a gate of the MOSFET transistor of the output stage, the negative feedback loop includes a coupling of the divider output node to the gate of the first enhancement MOSFET transistor.

2. The voltage regulation circuit according to claim 1, further comprising:

a second enhancement MOSFET transistor cascaded with the first enhancement MOSFET transistor, a gate of the second enhancement MOSFET transistor being coupled to ground through a first resistor of the resistive voltage divider, the gate of the second enhancement MOSFET transistor being coupled to the first resistor through a second resistor of the resistive voltage divider and coupled to the output node through a third resistor of the resistive voltage divider.

3. The voltage regulation circuit according to claim 2, wherein the gate of the first depletion MOSFET transistor is coupled to a source of the first depletion MOSFET transistor through a resistor, and coupled to the drain of the first enhancement MOSFET transistor through the second enhancement MOSFET transistor.

4. The voltage regulation circuit according to claim 1, wherein the first depletion MOS transistor and the MOSFET transistor of the output stage are cascaded by respective third and fourth depletion MOSFET transistors, the third depletion MOSFET transistor is coupled between the input voltage and the first depletion MOSFET transistor, a gate of the third depletion MOSFET transistor is coupled to a source of the first depletion MOSFET transistor, the fourth depletion MOSFET transistor is coupled between the input voltage and the MOSFET transistor of the output stage, a gate of the fourth depletion MOSFET transistor is coupled to a source of the MOSFET transistor of the output stage.

5. The voltage regulation circuit according to claim 1, wherein the gates of the first depletion MOSFET transistor and the MOSFET transistor of the output stage are coupled to ground by a compensation capacitor.

6. The voltage regulation circuit according to claim 1, wherein the first and second depletion MOSFET transistors and the first enhancement MOSFET transistor are Gallium Nitride (GaN) High Electron Mobility Transistors.

7. The voltage regulation circuit according to claim 1, wherein the MOSFET transistor of the output stage is a second depletion MOSFET transistor.

8. A voltage regulation circuit, comprising:

a first circuit branch and a second circuit branch in parallel and coupled between an input voltage and ground, the first circuit branch including a current generator including a first depletion MOSFET transistor, which gate source voltage is a Proportional To Absolute Temperature (PTAT) voltage, the input voltage being a direct current (DC) voltage supply; and a voltage reference circuit configured to supply a reference voltage which is independent with respect to temperature variations, the first depletion MOSFET transistor being coupled between the input voltage and the voltage reference circuit, the voltage reference circuit including a first enhancement MOSFET transistor, which gate source voltage is a Complementary To Absolute Temperature (CTAT) voltage, a source of the first enhancement MOSFET transistor being coupled to the ground through a source resistor, the first depletion MOSFET transistor configured to inject a PTAT current in the first circuit branch that determines a PTAT voltage drop on the source resistor, the second circuit branch including an output stage coupled between the input voltage and an output node on which a regulated voltage is output, the output stage including a second depletion MOSFET transistor coupled to a gate of the first depletion MOSFET transistor; and a resistive voltage divider that couples the output node to a gate of the first enhancement MOSFET transistor on which the reference voltage, which is a sum of the PTAT voltage drop on the source resistor and the gate source voltage of the first enhancement MOSFET transistor, is formed.

9. The voltage regulation circuit according to claim 8, wherein the first depletion MOS transistor and the second depletion MOSFET transistor are cascaded by respective third and fourth depletion MOSFET transistors, the third depletion MOSFET transistor is coupled between the input voltage and the first depletion MOSFET transistor, a gate of the third depletion MOSFET transistor is coupled to a source of the first depletion MOSFET transistor, the fourth depletion MOSFET transistor is coupled between the input voltage and the second depletion MOSFET transistor, a gate of the fourth depletion MOSFET transistor is coupled to a source of the second depletion MOSFET transistor of the output stage.

10. The voltage regulation circuit according to claim 8, further comprising:

a second enhancement MOSFET transistor cascaded with the first enhancement MOSFET transistor, a gate of the second enhancement MOSFET transistor being coupled to ground through a first resistor of the resistive voltage divider, the gate of the second enhancement MOSFET transistor being coupled to the first resistor through a second resistor of the resistive voltage divider and coupled to the output node through a third resistor of the resistive voltage divider.

11. The voltage regulation circuit according to claim 8, wherein the gates of the first depletion MOSFET transistor and the second depletion MOSFET transistor are coupled to ground by a compensation capacitor.

12. The voltage regulation circuit according to claim 8, wherein the first and second depletion MOSFET transistors and the first enhancement MOSFET transistor are Gallium Nitride (GaN) High Electron Mobility Transistors.

13. A voltage regulation circuit, comprising:

an input node configured to receive an input voltage;

a voltage reference circuit coupled to ground, the voltage reference circuit including a first enhancement transistor and a source resistor, a source of the first enhancement transistor being coupled to the ground through the source resistor;

a current generator circuit coupled between the input node and the voltage reference circuit, the current generator circuit including a first depletion transistor;

a voltage divider circuit coupled to ground;

an output stage coupled between the input node and the voltage divider circuit, the output stage including a second depletion transistor coupled to a gate of the first depletion transistor and coupled to the first enhancement transistor by the voltage divider circuit; and an output node configured to output a regulated voltage, the output node being between the voltage divider circuit and the output stage, the output node being coupled to a gate of the first enhancement transistor by the voltage divider circuit.

14. The voltage regulation circuit according to claim 13, wherein the voltage reference circuit and the current generator circuit are in parallel with the voltage divider circuit and the output stage.

15. The voltage regulation circuit according to claim 13, further comprising: a capacitor coupled between gates of the first depletion transistor and the second depletion transistor.

16. The voltage regulation circuit according to claim 13, further comprising: a protection circuit including third depletion transistor coupled between the input node and the first depletion transistor, and a fourth depletion transistor coupled between the input node and the second depletion transistor.

17. The voltage regulation circuit according to claim 13, wherein the input voltage is a direct current (DC) voltage supply, a gate source voltage of the first depletion transistor is configured to be a Proportional To Absolute Temperature (PTAT) voltage, a gate source voltage of the first enhancement transistor is configured to be a Complementary To Absolute Temperature (CTAT) voltage, and the voltage reference circuit configured to supply a reference voltage is a sum of the PTAT voltage drop on the source resistor and the gate source voltage of the first enhancement transistor.

* * * * *